April 21, 1964    D. B. ROBBINS    3,129,963
LOW RELEASE TORQUE THREADED JOINT
Filed June 30, 1960
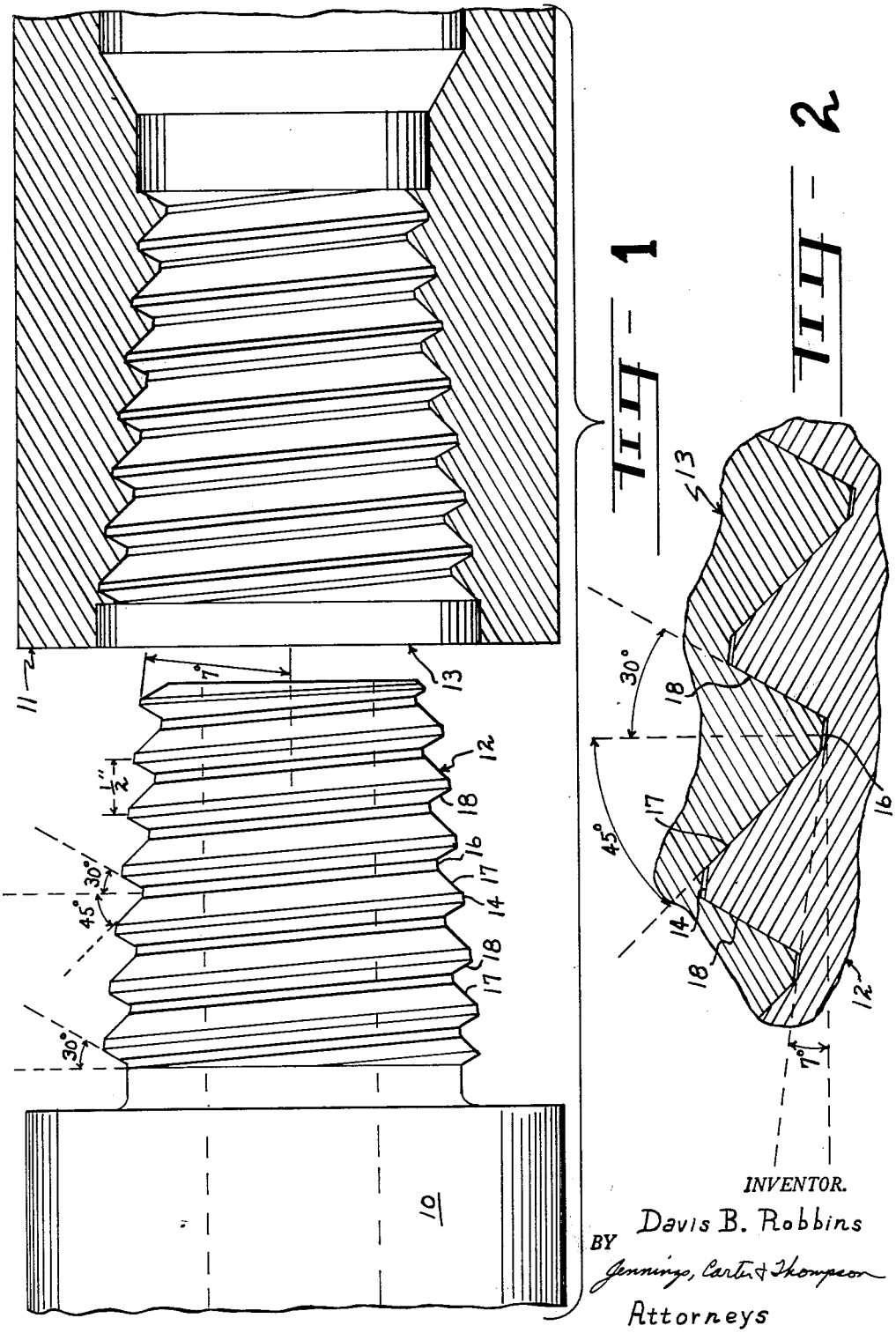
INVENTOR.
Davis B. Robbins
BY
Jennings, Carter & Thompson
Attorneys 3,129,963
LOW RELEASE TORQUE THREADED JOINT
Davis B. Robbins, % Robbins Machine & Mfg. Co., Oneonta, Ala.
Filed June 30, 1960, Ser. No. 39,884
4 Claims. (Cl. 285—334)

This invention relates to a threaded joint for cylindrical members and more particularly to a threaded joint for drill pipes.

An object of my invention is to provide a threaded joint for cylindrical members which shall have the proper pressure angle to prevent freezing of the cylindrical members to each other and yet provide a snug fit between the connected members.

Another object of my invention is to provide a threaded joint for cylindrical members which may be broken with less torque and yet will withstand greater pressures.

Another object of my invention is to provide a threaded joint of the character designated which may be made and broken in a minimum of time.

Another object of my invention is to provide a threaded joint for cylindrical members which shall be self-aligning whereby the members to be connected readily slip into place without damage to the threads and without cross threading taking place as the joint is made, thereby reducing breakage and damage of the connected members to a minimum.

A further object of my invention is to provide a threaded joint of the character designated which shall reduce to a minimum the binding effect caused by deflection or bending of relatively long drill pipe sections.

A still further object of my invention is to provide a threaded joint of the character designated which shall be simple of construction, economical of manufacture and one which outlasts conventional type threaded joints for cylindrical members.

Heretofore in the art to which my invention relates, various threaded joints have been provided for cylindrical members, such as drill pipes. However, such threaded joints have been unsatisfactory due to the fact that the threaded sections are easily damaged when the pipe sections become misaligned and it is very difficult to break the joint after it is made. That is, with conventional type threaded joints, it is often necessary to burn out the joint with a torch due to the fact that the connected parts freeze to each other and will not separate.

To overcome the above difficulties, I provide a threaded joint for cylindrical members which may be made in a minimum of time to form a tight and sturdy joint without loose play between the parts and at the same time the joint may be broken with a minimum of torque. For example, my improved joint may be broken with approximately one-half the breaking torque required to break conventional type joints. More specifically, my improved joint may be broken with approximately one-half the torque required to tighten my improved joint.

Cylindrical members having my improved threaded joint associated therewith are shown in the accompanying drawing, forming a part of this application, in which:

FIG. 1 is a side elevational view, partly in section, showing the complementary cooperating, tapered threaded surfaces, the male member being removed from the female member; and, FIG. 2 is an enlarged sectional view showing the threaded surfaces in engagement with each other.

Referring now to the drawing for a better understanding of my invention, I show a pair of abutting, cylindrical members 10 and 11. As shown in FIG. 1, the cylindrical members are provided with a male section 12 having an externally threaded tapered surface thereon for engaging an internally threaded, tapered surface on a female section 13. The male section 12 is provided with threads having crests 14 connected to roots 16 by flanks 17 and 18. The female section 13 is provided with internal threads which are complementary with and cooperate with the tapered threaded surface on the male section 12, as shown in FIG. 2.

The pitch of the threads on the male and female sections is approximately one-half inch. Preferably, the crests are approximately .09 inch in width. The flanks 17 or sides facing the smaller end of the tapered surfaces form an included angle ranging from approximately 40° to 50° with a plane extending normal to the axial center line of the cylindrical members 10 and 11. The flanks 18 or sides of the threads facing the larger end of the tapered surfaces form an included angle ranging from approximately 25° to 35° with a plane extending normal to the axial center line of the cylindrical members 10 and 11. Preferably, the flanks 17 form an included angle of approximately 45° with a plane extending normal to the axial center line of the cylindrical members while the flanks 18 form an included angle of approximately 30° with a plane extending normal to the axial center line of the cylindrical members.

As clearly shown in FIG. 1, the complementary cooperating threaded surfaces on the male and female members 12 and 13, respectively, are tapered at an angle of approximately 7 to 9 degrees from the longitudinal axis of the cylindrical members 10 and 11. That is, the threaded surfaces are tapered to form an included angle of from 7 to 9 degrees with a plane passing through the threaded surfaces and extending parallel to the axial center line of the cylindrical members, as shown in FIG. 2. Preferably, the cooperating threaded surfaces are tapered to form an included angle of approximately 7° relating to the longitudinal axis of the cylindrical members. By providing such complementary, cooperating threaded surfaces on the male and female sections, together with threads having a pitch of ½ inch and flank portions as described hereinabove, the male and female members are readily joined even through they might be in misalignment relative to each other.

From the foregoing, it will be seen that I have devised an improved threaded joint which may be broken with a minimum amount of torque and at the same time provides a tight and sturdy joint. By providing a critical pitch of approximately one-half inch, the pressure angle is proper to prevent freezing of the joint and at the same time provides a snug fit. By providing a flank portion on the sides facing the smaller end of the tapered surfaces which forms an included angle of from approximately 40° to 50° with a plane extending normal to the axial center line of the cylindrical members, a relatively long slope is provided to permit easy slippage of the section 12 into the section 13. Also, by providing a flank on the sides facing the larger end of the tapered surfaces which form an included angle ranging from approximately 25° to 35° with a plane extending normal to the axial center line of the cylindrical members, a relatively steep side is provided for taking the load as the joint is made. The long angle slope of from 40° to 50° thus backs up or supports the stress applied to the flanks or sides which face the larger end of the tapered surfaces. Furthermore, the provision of a pitch of approximately one-half inch provides a fast lead whereby the joint may be made and broken in a minimum of time. In actual practice, I have found that by providing the critical pitch of approximately one-half inch, together with the specific inclined flank portions described hereinabove, the proper pressure angle is provided to assure trouble-free operation of the threaded joint and at the same time reduce breakage and malfunctioning of the joint to a minimum.

While I have shown my invention in but one form, it will be obvious to those skilled in the art that it is not so limited, but is susceptible of various changes and modifications without departing from the spirit thereof, and I desire, therefore, that only such limitations shall be placed thereupon as are specifically set forth in the appended claims.

What I claim is:

1. A threaded joint for drill pipes comprising two cylindrical members having substantially complementary cooperating tapered surfaces with single threads thereon, the threads having a pitch of approximately one-half inch and having crests and roots connected on the sides facing the smaller end of the tapered surfaces by flanks which form an included angle ranging from approximately 40° to 50° with a plane extending through an adjacent root and normal to the axial center line of said cylindrical members and connected on the sides thereof facing the larger end of the tapered surfaces by flanks which form an included angle ranging from approximately 25° to 35° with a plane extending through an adjacent root and normal to the axial center line of said cylindrical members.

2. A threaded joint for drill pipes as defined in claim 1 in which the flanks at the sides facing the smaller end of the tapered surfaces form an included angle of approximately 45° with a plane extending through an adjacent root and normal to the axial center line of said cylindrical members and the flanks at the sides facing the larger end of the tapered surfaces form an included angle of approximately 30° with a plane extending through an adjacent root and normal to the axial center line of said cylindrical members.

3. A threaded joint for drill pipes comprising two cylindrical members having substantially complementary cooperating surfaces with single threads thereon and tapered at an angle of approximately 7° to 9° from the longitudinal axis of said cylindrical members, the threads having a pitch of approximately one-half inch and having crests and roots connected on the sides facing the smaller end of the tapered surfaces by flanks which form an included angle ranging from approximately 40° to 50° with a plane extending through an adjacent root and normal to the axial center line of said cylindrical members and connected on the sides thereof facing the larger end of the tapered surfaces by flanks which form an included angle ranging from approximately 25° to 35° with a plane extending through an adjacent root and normal to the axial center line of said cylindrical members.

4. A threaded joint for drill pipes as defined in claim 3 in which the threaded surfaces are tapered at an angle of approximately 7° from the longitudinal axis of said cylindrical members.

References Cited in the file of this patent

UNITED STATES PATENTS

| | | |
|---|---|---|
| 2,056,112 | Protin | Sept. 29, 1936 |
| 2,062,407 | Eaton | Dec. 1, 1936 |
| 2,167,559 | Upson | July 25, 1939 |
| 2,196,966 | Hammer | Apr. 9, 1940 |
| 2,772,102 | Webb | Nov. 27, 1956 |
| 2,885,225 | Rollins | May 5, 1959 |

FOREIGN PATENTS

| | | |
|---|---|---|
| 786,652 | Great Britain | Nov. 20, 1957 |

OTHER REFERENCES

Drilling and Production Practice (Kelly and Hebard), copyright 1950 by the American Petroleum Institute (pp. 381–390, p. 385 relied on).